United States Patent Office 3,112,191
Patented Nov. 26, 1963

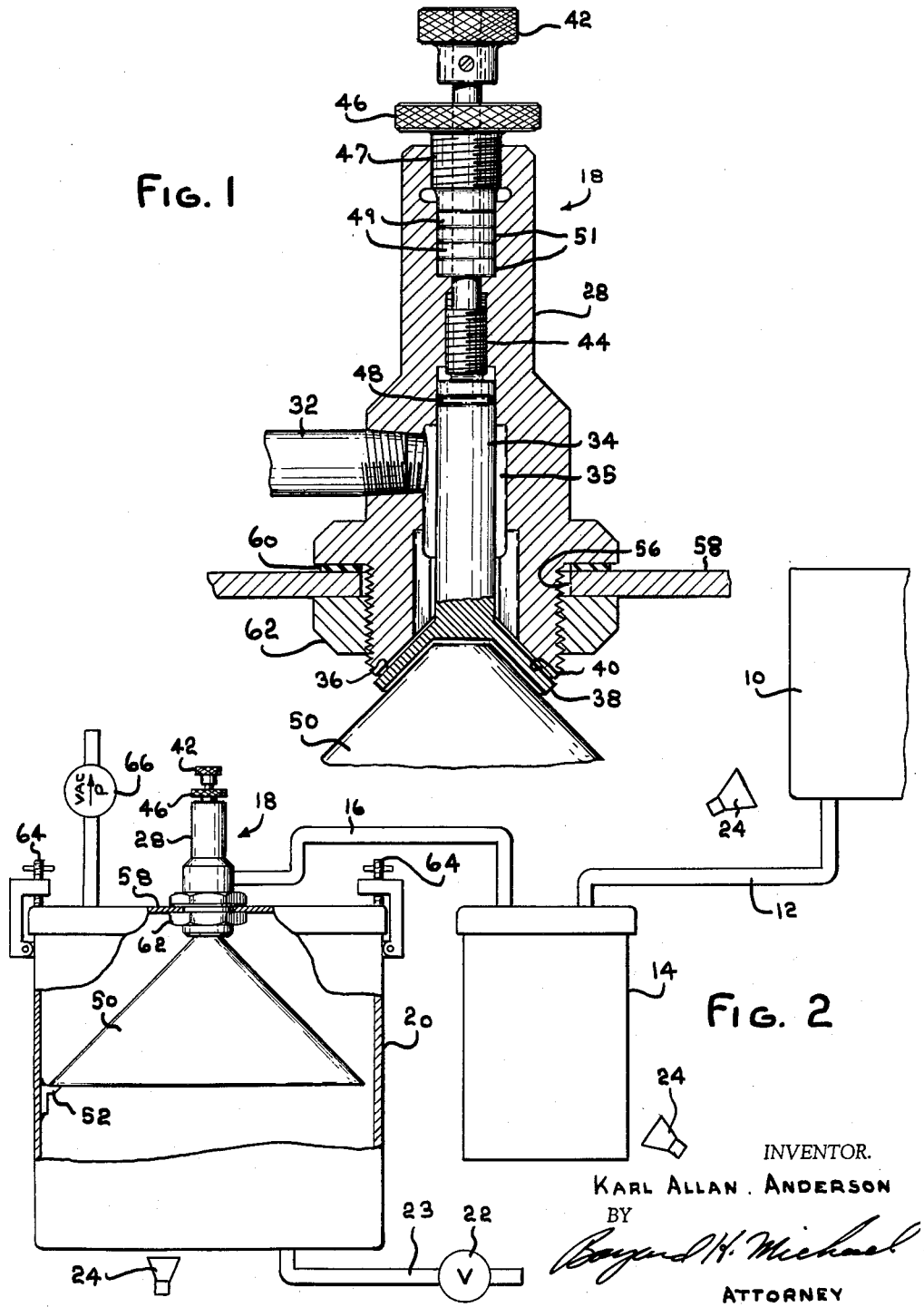

3,112,191
DE-AERATION APPARATUS
Karl Allan Anderson, Park Ridge, Ill., assignor to Controls Company of America, Schiller Park, Ill., a corporation of Delaware
Filed June 15, 1959, Ser. No. 820,427
4 Claims. (Cl. 55—194)

This invention relates to de-aeration apparatus particularly suited for liquid compounds and mixtures of liquids and solids which are notably difficult to de-aerate.

Encapsulation of various products is especially important commercially because the encapsulant provides a moisture resistant cover which acts as an insulation for the finished product. This characteristic is adversely affected if bubbles remain in the encapsulating material after casting. Particularly where casting in a vacuum the size of the bubble will increase while curing leaving a large hole in the cover. Industry recognizes that de-aeration of the encapsulating material is essential to produce a product that will stand up under operating conditions. Various methods have been devised to produce a material in quantities sufficient for a mass production operation and that will be substantially free from air bubbles.

Encapsulating compounds generally are composed of a resin containing a filler, solid pigments, solvents, and products known as flexibilizers. This invention is applicable basically to compounds having a high viscosity characteristic. As will be understood from the following description any apparatus which can effectively de-aerate this compound will have wide application in other fields. At room temperature and atmospheric conditions, compound containing resins have a very high viscosity and it is virtually impossible to de-aerate large quantities of these compounds because the bubbles will not rise to the surface even under an extreme vacuum. The practice of heating the compound to decrease the viscosity and then placing the material under a vacuum is limited since the volatility of some of the components listed above is relatively high and they cannot be subjected to too high a vacuum nor too high a temperature. In the range of pressure and temperature in which these materials are workable they have a viscosity approaching that of corn syrup. Even at this viscosity any air which has been entrapped below the surface of the material will not rise to the surface under the maximum vacuum allowable.

In the present invention, de-aeration of a high viscosity compound is speedily accomplished by forcing the compound through a thin nozzle opening. The nozzle can be adjusted for different viscosity compounds so that a shearing action is exerted on the compound which compresses any bubbles passing through the nozzle and essentially removes the surface film from the sides of the bubble. The nozzle discharges into a vacuum so that the pressure difference between the interior of the bubble and the vacuum will cause the bubble to pop or burst. The invention thus provides a means for continuously de-aerating a compound at a sufficient rate to supply a mass production operation.

The primary object of this invention is to provide an apparatus for de-aerating a high viscosity compound.

Another object is to provide an apparatus for de-aerating a high viscosity compound which reduces the time required for complete de-aeration.

A further object of the invention is to provide an apparatus for de-aerating a high viscosity compound which is operable in the range of temperature and pressure that will not affect the characteristics of the components within the compound.

A still further object is to provide a nozzle for a de-aerating apparatus which can be easily cleaned.

Other objects and advantages will be pointed out in, or be apparent from the specification and claims as will obvious modifications of the single embodiment shown in the drawings in which:

FIGURE 1 is a front elevation in section showing the valve used in the process.

FIGURE 2 is a view partly in section of the apparatus used in the process.

Referring to the drawings, a compound containing an epoxy resin is transferred from a bulk storage tank 10 through pipe 12 to pressure tank 14 where sufficient pressure is built up to force the compound through a pipe 16 to a nozzle 18 and then into a vacuum pot 20. When the pot has been filled the valve 22 is opened and the compound is forced out of the pot through a pipe 23 by increasing the pressure within the pot. The temperature of the compound as it passes through the system is maintained constant by any conventional means generally shown as comprising a system of infra-red bulbs 24.

The nozzle 18 consists of a body 28 having an inlet 32 and a valve stem 34. The resin flows through the inlet into an annular passage 35 and out through an orifice 36. A valve 38 shown in the form of a cone on the stem 34 cooperates with a complementary face 40 in the orifice to shear the resin passing therethrough and forming a thin stream. The thickness of the stream can be adjusted by turning the knob 42 to move the stem up or down through a threaded portion 44. The stem can be locked from further rotation by set nut 46 which is threaded at 47 and bears against alternate layers of metal rings 49 and rubber rings 51, the latter of which will expand against the stem preventing further rotation. A seal ring 48 on the valve stem below the threaded portion 44 prevents the compound from flowing into the threaded portion 44. The nozzle can be easily disassembled by removing turning knob 42 and screwing the lock nut from the casing. The valve stem can then be removed from the casing and the passage will be free to be cleaned.

The compound streams from the nozzle onto a sloped surface 50 shown in the form of a cone mounted on brackets 52 within vacuum pot 20. The instant the compound leaves the nozzle the bubbles are compressed within the stream and are so close to the surface because of the shearing action of the valve that they will pop due to the difference in pressure between the interior of the bubble and the vacuum within the pot 20. Any bubbles remaining in the stream will be drawn out as the compound flows down the sloped surface. The nozzle is sealed in aperture 56 in the cover 58 by a gasket 60 and nut 62. The cover 58 is secured to the vacuum pot 20 by clamps 64 and the vacuum is maintained constant within the vacuum pot by a pump 66. When the vacuum pot has been filled, the pump is turned off and valve 22 is opened. The compound is forced to flow from the pot by increasing the pressure within the pot by any suitable means. A positive displacement pump and check valve can be provided on pipe 23 for continuous operation if desired. In this case the nozzle will discharge into a vacuum and the de-aerated compound will be pumped against a positive pressure through the check valve.

Although but one embodiment of the present invention has been illustrated and described, it will be apparent to those skilled in the art that various changes and modifications may be made therein without departing from the spirit of the invention or from the scope of the appended claims.

I claim:

1. A de-aerating apparatus comprising means for supplying material under pressure to a nozzle to be de-aerated, said nozzle having an inlet, an outlet, and a fluid flow passage connecting said inlet and outlet, valve means at said outlet including a valve member and a cooperating seat for said valve, said valve member and seat respectively having inclined surfaces disposed in opposed spaced relation and defining betwen them a fluid shearing passage flaring outwardly from the inlet side towards the discharge side of said seat, and means for adjusting the valve with respect to the seat to vary the distance therebetween while maintaining substantially constant the opposed areas thereof, a tank into which said nozzle discharges and means for maintaining a vacuum in said tank whereby to form a relatively thin stream of material so that bubbles entrapped therein will lie close to the surfaces of the stream and will break or pop due to the pressure differential to which they are subjected within the tank.

2. The apparatus described in claim 1 wherein said valve member is disposed axially of said nozzle and wherein said fluid shearing passage is annular in shape and concentrically disposed about the axis of said nozzle.

3. The apparatus described in claim 2 wherein the cooperating surfaces of the valve and seat respectively are sections of a cone.

4. The apparatus described in claim 1 wherein means are mounted within said tank in juxtaposed relation to the discharge side of said valve and which presents a downwardly and outwardly inclined surface onto which said sheared fluid discharging from said valve is deposited in a thin stream.

References Cited in the file of this patent
UNITED STATES PATENTS

| | | |
|---|---|---|
| 1,575,287 | Spindler | Mar. 2, 1926 |
| 2,668,598 | Seed | Feb. 9, 1954 |
| 2,714,938 | Smith | Aug. 9, 1955 |
| 2,944,626 | Douglas et al. | July 12, 1960 |